US010769599B2

(12) United States Patent
Sobolevski

(10) Patent No.: US 10,769,599 B2
(45) Date of Patent: Sep. 8, 2020

(54) METHOD FOR CONDUCTING MONETARY AND FINANCIAL TRANSACTIONS BY TREATING AMOUNTS AS COLLECTIONS OF DISTINCT UNITS OF ACCOUNT

(71) Applicant: Vadim Sobolevski, London (GB)

(72) Inventor: Vadim Sobolevski, London (GB)

( * ) Notice: Subject to any disclaimer, the term of this patent is extended or adjusted under 35 U.S.C. 154(b) by 771 days.

(21) Appl. No.: 15/149,229

(22) Filed: May 9, 2016

(65) Prior Publication Data
US 2017/0323276 A1 Nov. 9, 2017

(51) Int. Cl.
*G06Q 40/00* (2012.01)
*G06Q 20/10* (2012.01)
*G06Q 20/06* (2012.01)
*G06Q 20/40* (2012.01)
*G06Q 20/38* (2012.01)

(52) U.S. Cl.
CPC ........... *G06Q 20/10* (2013.01); *G06Q 20/065* (2013.01); *G06Q 20/389* (2013.01); *G06Q 20/401* (2013.01)

(58) Field of Classification Search
CPC ........ G06Q 20/00; G06Q 20/10; G06Q 20/06; G06Q 20/065; G06Q 20/389; G06Q 20/401
USPC ...................................................... 705/35–40
See application file for complete search history.

(56) References Cited

U.S. PATENT DOCUMENTS

| | | | |
|---|---|---|---|
| 9,774,401 B1 * | 9/2017 | Borrill | H04L 9/0852 |
| 2011/0258686 A1 * | 10/2011 | Raj | G06Q 20/10 |
| | | | 726/6 |
| 2013/0218664 A1 * | 8/2013 | Carlson | G06Q 30/0244 |
| | | | 705/14.43 |
| 2014/0149285 A1 * | 5/2014 | De | G06O 20/3276 |
| | | | 705/41 |
| 2014/0172708 A1 * | 6/2014 | Chrapko | G08G 1/096775 |
| | | | 705/44 |
| 2015/0026027 A1 * | 1/2015 | Priess | G06Q 20/4016 |
| | | | 705/35 |
| 2015/0149343 A1 * | 5/2015 | Schwartz | G06Q 20/065 |
| | | | 705/39 |

(Continued)

FOREIGN PATENT DOCUMENTS

CA 2542068 A1 * 10/2006 ............. G06Q 20/10

OTHER PUBLICATIONS

Jayasree et al: "Money Laundering Identification on Banking Data Using Probabilistic Relational Audit Sequential Pattern". Asian Journal of Applied Sciences, 8: 173-184 (Year: 2015).*

*Primary Examiner* — Edward J Baird
(74) *Attorney, Agent, or Firm* — Sheridan Ross P.C.

(57) ABSTRACT

A method for conducting monetary and financial transactions in an economy by treating amounts as collections of distinct individual, minimal, and indivisible units of account, each of which has a persistent identity and history throughout its lifecycle. A method is disclosed for conducting monetary transactions on the basis of appending the record of relationship between each individual unit of account and its respective owners throughout the lifecycle of the unit. Further, a method is disclosed for identifying the units in binary computer notation and assigning specific informational content to each unit by designating various sub-sections within the binary identifier of each unit to hold specific information and values relevant to the unit.

8 Claims, 3 Drawing Sheets

(56) References Cited

U.S. PATENT DOCUMENTS

| | | | |
|---|---|---|---|
| 2015/0242825 A1* | 8/2015 | Mills | G06Q 20/0655 |
| | | | 705/64 |
| 2015/0302398 A1* | 10/2015 | Desai | G06F 8/60 |
| | | | 705/41 |
| 2015/0324789 A1* | 11/2015 | Dvorak | G06Q 20/3823 |
| | | | 705/67 |
| 2016/0260089 A1* | 9/2016 | Chen | G06Q 20/367 |
| 2017/0228731 A1* | 8/2017 | Sheng | G06Q 20/401 |
| 2019/0050853 A1* | 2/2019 | Kumar | G06Q 20/10 |

* cited by examiner

| Table 1 | |
|---|---|
| User | Balance |
| Account A | $0.03 |
| Account B | $0.08 |
| Account C | $0.04 |
| System Total | $0.15 |

| Table 2 | |
|---|---|
| User | Balance |
| Account A | $0.05 |
| Account B | $0.06 |
| Account C | $0.04 |
| System Total | $0.15 |

| Table 3 | | |
|---|---|---|
| Unit | User | Timestamp |
| QWE123 | Account A | 4/12/2016 13:49 |
| RTY456 | Account B | 4/12/2016 13:49 |
| UIO789 | Account A | 4/12/2016 13:49 |
| PAS98 | Account B | 4/12/2016 13:49 |
| DFG765 | Account C | 4/12/2016 13:49 |
| HJK432 | Account A | 4/12/2016 13:49 |
| LZX123 | Account C | 4/12/2016 13:49 |
| CVB445 | Account B | 4/12/2016 13:49 |
| NMM678 | Account C | 4/12/2016 13:49 |
| NBV980 | Account B | 4/12/2016 13:49 |
| CXZ765 | Account C | 4/12/2016 13:49 |
| LKJ432 | Account B | 4/12/2016 13:49 |
| HGF123 | Account B | 4/12/2016 13:49 |
| DSA432 | Account B | 4/12/2016 13:49 |
| POI567 | Account B | 4/12/2016 13:49 |

| Table 4 | |
|---|---|
| User | Balance |
| Account A | $0.03 |
| Account B | $0.08 |
| Account C | $0.04 |
| System Total | $0.15 |

| Table 5 | | |
|---|---|---|
| Unit | User | Timestamp |
| PAS98 | Account A | 4/12/2016 15:50 |
| CVB445 | Account A | 4/12/2016 15:50 |
| QWE123 | Account A | 4/12/2016 13:49 |
| RTY456 | Account B | 4/12/2016 13:49 |
| UIO789 | Account A | 4/12/2016 13:49 |
| PAS98 | Account B | 4/12/2016 13:49 |
| DFG765 | Account C | 4/12/2016 13:49 |
| HJK432 | Account A | 4/12/2016 13:49 |
| LZX123 | Account C | 4/12/2016 13:49 |
| CVB445 | Account B | 4/12/2016 13:49 |
| NMM678 | Account C | 4/12/2016 13:49 |
| NBV980 | Account B | 4/12/2016 13:49 |
| CXZ765 | Account C | 4/12/2016 13:49 |
| LKJ432 | Account B | 4/12/2016 13:49 |
| HGF123 | Account B | 4/12/2016 13:49 |
| DSA432 | Account B | 4/12/2016 13:49 |
| POI567 | Account B | 4/12/2016 13:49 |

| Table 6 | |
|---|---|
| User | Balance |
| Account A | $0.05 |
| Account B | $0.06 |
| Account C | $0.04 |
| System Total | $0.15 |

| Table 7 | |
|---|---|
| CVB445 | |
| Account B | 4/12/2016 13:49 |
| Account A | 4/12/2016 15:50 |

FIG. 1

METHOD FOR CONDUCTING MONETARY AND FINANCIAL TRANSACTIONS BY TREATING AMOUNTS AS COLLECTIONS OF DISTINCT UNITS OF ACCOUNT

STATEMENT REGARDING FEDERALLY SPONSORED RESEARCH OR DEVELOPMENT

Not Applicable

CROSS-REFERENCE TO RELATED APPLICATIONS

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to the intersection of monetary economics, finance, central banking, commercial banking, electronic payments, as well as computer science, and electronic data processing.

Modern financial and monetary system rests on a fundamental assumption that money is fungible, which results in monetary transactions and balances customarily being expressed in terms of amounts. The resultant loss of the identity, and therefore the history, of discrete units of account that make up each amount masks the rich informational content of financial flows, creating shortcomings for monetary policy, fraud and illicit activity prevention, marketing, and other challenges of the modern world.

The rise in computer processing power and storage capacity over the past decades has inspired various attempts to apply computer technology to financial transactions, resulting, among other things, in the recent rise in popularity of "digital" currencies, such as Bitcoin and its variations.

It is customary for such technologies to represent monetary values (often referred to as "coins") with various forms of digital identification, but in such cases the values of the coins continue to be treated in terms of amounts. An amount is something that is further divisible or combinable and therefore something that doesn't respect the identity—and therefore the history—of each minimal and indivisible unit of account that makes up the amount. Despite being commonly referred to as "digital," such technologies remain "analog" conceptually.

BRIEF SUMMARY OF THE INVENTION

The long-held assumption of fungibility of money has traditionally eliminated the significance of individual minimal units of account that comprise amounts, since all units are assumed to have equal monetary value and are therefore substitutable. This abstraction overlooks the fact that in addition to monetary value, each individual minimal unit of account within a monetary system also possesses informational value, which is associated with its unique usage history, and which is valuable in its own right, independently from its monetary value.

The present disclosure describes a method for accounting for monetary and financial transactions and balances, whereby amounts are represented as collections of distinct, minimal, and indivisible units of account, each of which is identified individually and retains its identity throughout its lifecycle. The disclosure offers a specific method for identifying individual units of account and for embedding informational content into each unit, all by relying on basic computer data structures.

By focusing on the persistent identity of discrete minimal and indivisible units of account, the disclosure aims to unlock the previously unexplored informational aspect of financial flows in the established global monetary and financial infrastructure, with potential applications into the fields of economy management, financial fraud prevention, banking, marketing, and many others.

BRIEF DESCRIPTION OF THE DRAWINGS

FIG. 1 depicts simplified financial account balances that help to illustrate the conceptual difference between how monetary and financial transactions are proposed to be represented by the current disclosure, compared with how they are represented under the traditional monetary convention at present.

DETAILED DESCRIPTION OF THE INVENTION

Figure 2:
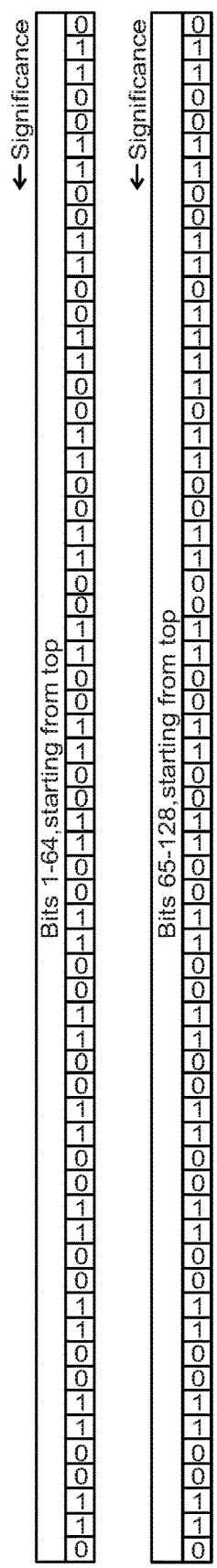
FIG. 2 illustrates a bit sequence of 128 bits, which serves as an example of how a unique minimal and indivisible unit of account can be described in the computer-based binary notation. The sequence is depicted vertically and is split into two halves for better visibility and page fit.

The existing commonly accepted monetary convention treats balances and transactions as amounts, where such amounts are reflected and stored on a computer-based storage device, such as a database. FIG. 1 illustrates an example of a simplified stylized economy with three users: Account A, Account B, and Account C, with balances of 3, 8, and 4 cents, respectively, for the total amount of money in the economy of 15 cents, Table 1. As an example, when Account B makes a payment of 2 cents to Account A, the payment is ultimately reflected in the system by updating the respective balances of these two users in the database by the amount of 2 cents, Table 2. Table 2 represents the updated version of Table 1 after this transaction and reflects the updated amounts belonging to each user.

Still referring to FIG. 1, the present disclosure proposes an alternative method, according to which the balance of each user is represented by associating a collection of unique, minimal, and indivisible units of account belonging to each user at the given time with the account of that user, Table 3. Similarly to Table 1, Table 3 reflects a stylized prototype of a data-table in a computer-based storage device, such as a database. Unlike Table 1, Table 3 reflects user balances not by associating each user with the amount belonging to the user, but rather by associating each minimal and indivisible unit of value that makes up that amount with the user to which that amount belongs.

Still referring to FIG. 1, Column 1 (Unit) in Table 3 contains simplified unique identifiers, each of which represents a minimal and indivisible unit of value. Column 2

(User) reflects the stylized identity of the user to which the unit in the given row belongs. Column 3 (Timestamp) reflects the timestamp of the latest transaction when the unit in the given row was recorded as belonging to the user in the given row. A simple database query of Table 3 that sumps up all unique units belonging to each unique user, according to the most recent timestamps, can produce a compact result, Table 4, which summarizes all current user balances and produces the same information as is reflected in Table 1.

Still referring to FIG. 1, under the method proposed by the present disclosure, when Account B makes a payment to Account A (again, 2 cents as in the prior example), the system selects the corresponding number of distinct units that are currently recorded as belonging to Account B, according to the latest timestamps (in this case 2 units) and appends Table 3 with 2 new entries to associate the selected units with Account A, Table 5. Table 5 represents the updated version of Table 3 after the above transaction and contains two additional rows that reflect the transfer of ownership of units PAS98 and CVB445 from Account B to Account A. The rows in Table 5 associating units PAS98 and CVB445 with Account A have a more recent timestamp compared with the rows associating the same units with Account B, reflecting the fact of payment (the transfer of ownership) of the two units from Account B to Account A. The rows in question (both old and new) are depicted in bold font in Table 5.

Still referring to FIG. 1, a new database query of Table 5 that sumps up all unique units according to the most recent timestamps can produce a compact result, Table 6, which summarizes all updated user balances and reflects the change of balances for Account A and Account B. The table reflects the same information as Table 2.

Recording transactions by appending rather than replacing the existing records helps to retain each unit's "belonging" history, enabling a permanent life-long trace of each individual unit, as it evolves from being a property of one member of the financial network to another. As an example, still referring to FIG. 1, a simple database query of Table 5 can produce a life-long trace of unit CVB445, as shown in Table 7.

For illustration purposes, the simplified transactions and records depicted in FIG. 1 and discussed above rely on stylized random combinations of digits and letters, such as CVB445, to identify unique, minimal, and indivisible units of account. In practice, the present disclosure proposes a method for representing the individual unique, minimal, and indivisible units of account with bit sequences of a certain fixed length in computer binary notation. Sequences of 128 bits are proposed as best mode, in order to create enough addressable space to cover the large magnitudes of money supply and the high volumes of transactions, as well as to allow sufficient space within the sequence to be reserved for sub-section(s) with bit combinations that carry specific content, as well as sub-section(s) with bit combinations that are purely random.

FIG. 2 illustrates an example of how a unique, minimal and indivisible unit of account can be described under the method proposed by the present disclosure. The 128-long bit sequence depicted in FIG. 2 represents the numeric value of 136,112,946,768,376,000,000,000,000,000,000,000 (unsigned, with no decimals). The sequence is depicted vertically and is split into two halves for better page-fit, with the top-most bit in the left half being the least significant bit. Under the method proposed by the present disclosure, the actual numeric value of this bit sequence has no monetary meaning and significance as such—the numeric value only serves as a unique identifier of one unique, minimal, and indivisible unit of account (in this case, one cent, under the assumption that one cent is the minimal unit of account in the given system).

Figure 3:
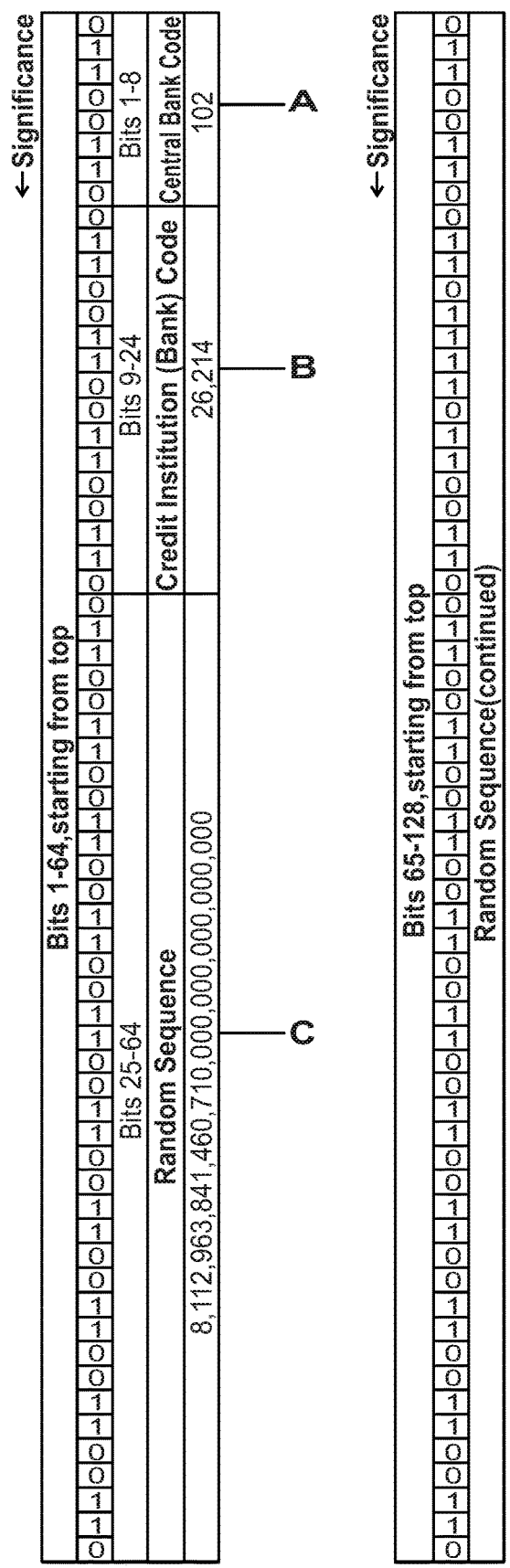
FIG. 3 illustrates the same bit sequence as in FIG. 2, with a more detailed description of how the full sequence can be conceptually divided into designated bit sub-sections, whereby some sub-sections are designated to carry specific informational content, while others are designated to carry a random sequence of bits. The sequence is depicted vertically and is split into two halves for better visibility and page fit.

FIG. 3 illustrates how the same bit sequence that is depicted in FIG. 2 can be interpreted by conceptually splitting the whole sequence into several sub-sections of pre-determined length and by assigning specific informational content to some sub-section(s), while leaving the content of other sub-section(s) as random. Still referring to FIG. 3, the first sub-section of 8 top-most bits in the sequence, A, is designated to identify a hypothetical Central Bank with the numeric value 102 (once again, by using the binary notation that treats the top-most bit as least significant). The following sub-section of 16 bits, B, is designated to identify a hypothetical Credit Institution (a commercial bank) that operates under the jurisdiction of the above-mentioned Central Bank 102. Restarting the bit count at the start of this sub-section (treating the 9th bit of the whole sequence as the first bit in this sub-section) yields the numeric value 26,214, which identifies this Credit Institution. Finally, the third sub-section of 104 bits, C, contains a random combination of bits (the sub-section starts in the left half of the sequence and continues through the entire right half). Restarting the bit count at the start of this sub-section (treating the 25th bit of the whole sequence as the first bit in this sub-section) yields the numeric code 8,112,963,841, 460,710,000,000,000,000,000. This randomly generated unique identifier, when combined with the other non-random value from the sub-sections described above, makes this whole bit sequence unique within the system by forming the above-mentioned numeric value 136,112,946,768,376,000, 000,000,000,000,000,000,000.

Once again, the actual numeric value of the full bit sequence depicted in FIG. 3 has no monetary significance— it simply results from combining several bit sub-sections of pre-determined length, some of which are designated to have specific meaning (such as the Central Bank code) while other(s) are designated to be random (such as the Unique Bit Sequence and the end). The resultant numerical value represented by the whole bit sequence serves as a unique identifier of the given minimal and indivisible unit of account.

Constructing the unique unit identifiers as bit sequences makes the entire system more available for querying and mathematical analysis. Splitting the full bit sequence into designated sub-sections, some of which can hold informational content, enables each unique identifier to reflect valuable information about the unit of account that it identifies, such as the unit's origin, type, designated purpose, or any other information that might be relevant under the specific implementation of the disclosure. In the above example, when a commercial bank originates a new loan by creating money under the conventions of the fractional reserve banking system, the bank's identity can be imprinted into the unit by assigning the bank's "ID" into the "Commercial Bank" sub-section, as described above.

The example in FIG. 3 is just one sample approach to designating specific sub-sections with random and non-random bit sequences in order to create a unique identifier for a minimal and indivisible unit of account. Parties skilled in the art will recognize various specific practical implementations of this disclosure, which will ultimately dictate which sections, if any, and of what length (bit count) are needed or not needed for their respective purposes.

For example, for a system that operates within only one country, the Central Bank section may be superfluous, since it would be understood that all monetary units in the country are created under the jurisdiction of the same central bank. Alternatively, the Central Bank and Credit Institution sections may be combined into just one section, in which case the designated Central Bank code may indicate that the given unit of account was created by the central bank and represents "central bank money," while codes of commercial banks may indicate that the given unit was created by a commercial lending institution in the process of credit creation and therefore represents "commercial bank money," should this distinction be relevant for the practical implementation of this disclosure.

Furthermore, those skilled in the art may find it useful to allocate additional bit-count to designate additional sub-sections to reflect content relevant to the given implementation, and to leave less bit-count for the randomizing sub-section. For example, an "origin" sub-section of a certain length may be introduced, which could indicate whether the given unit of account was created as a new commercial bank loan, a credit-card transaction, an interest payment on a deposit, or a monetary emission by a central bank. As another example, a "purpose" sub-section may be introduced, which may restrict the usage of the given unit of account to a range of specific purposes. When a government wants to provide an economic stimulus package by conducting a monetary emission via its central bank, the new money created under the emission may have a specific range of "purpose" codes, so as to ensure that the money can be spent for a range of designated purposes.

The length of 128 bits suggested as best mode offers the flexibility to describe far more unique identifiers than necessary to address the entire international financial system by using monetary denominations roughly equivalent to those currently adopted in major economies, such as the United States and the European Union.

As an example, continuing with the sequence depicted in FIG. 3, the first 8 bits designated to describe the central bank code, A, can address up to 255 unique entities—more than the number of countries (and therefore central banks) in the world. The following 16 bits, B, can address over 65,000 unique entities (per each central bank identified by A)—far more than the number of credit institutions in each of the largest and the most advanced economies in the world. For comparison, there are just over 5,000 credit institutions in the U.S. (down from approximately 14,500 in the mid 1980ies). Similarly, there are just over 6,000 credit institutions under the jurisdiction of the European Central Bank (down from approximately 9,000 in 1998). The length of 128 bits, as suggested for best mode, leaves 104 bits, which can further describe approximately the equivalent of $2 \times 10^{17}$ trillion of US dollars per credit institution, per central bank, compared with the M2 money supply of roughly just $12 trillion in the entire United States at the time of writing.

Such large order of magnitude afforded by 128-long bit sequences allows practical implementations of this disclosure to designate additional sub-section(s), as needed, to reflect any other content relevant to the given implementation, and still have enough bits left to hold a randomizing bit sequence sufficiently long to ensure that each unit in the system is unique.

By enabling persistent identities for individual minimal and indivisible units of account that make up amounts in the financial system, the disclosure enables an entirely new field of data analysis and mining that focuses on the movement of atomic units that make up financial flows, including when and by what entity each unit was originated, what transactions it has taken place in, where it will end up in the future after a point of observation, and how frequently it changes its ownership. This informational aspect of financial flows has previously remained unexplored, while it may have numerous valuable applications into monetary finance, banking, and related fields.

The disclosure can help central banks deal with the challenges related to providing more effective and targeted monetary stimulus to economic activity. In the current financial system, once new money is injected into the economy, it blends with the existing stock of money, which makes it impossible to monitor and analyze how the new money is used, let alone to incentivize economic agents to use the new money in the desired way (or to prevent economic agents from using the new money in certain ways). This limitation leads to financial bubbles and hinders the recovery in real economic activity.

The disclosure could help central banks and other government institutions to engage in the analysis and monitoring of economic activity to gain a better understanding of financial flows within the economy. At present, most economic statistics rely on "stock" analysis, since any "flow" analysis is limited under the present convention of fungible money. This technology breaks that barrier and makes possible very detailed analysis of real economic activity, which is complementary to central bank efforts discussed above.

The disclosure may help commercial banks, credit card companies, payment networks, and other elements of the payment and transaction infrastructure to analyze modern financial flows with a degree of depth and detail not previously available. At present, banks and payment networks monetize their existing infrastructure by charging fees—transaction fees for payments and interest spread for loans. This technology can help banks and payment networks to rely more on the monetization of analytics and intelligence of global financial flows in order to generate revenue, and thus lower (or eliminate) transaction fees and interest charges.

The disclosure could help government institutions to trace money laundering, terrorist financing, and other illicit activity by providing an unprecedented level of detail to financial transactions, both in a backward-looking and forward-looking fashion. One example of the urgency of such needs is the recent attempt by various European authorities to reduce or ban the circulation of EUR 500 notes—an effort subsequently echoed by various American policymakers in relation to USD 100 notes in the United States as well.

The above are just some examples of how specific implementations of the technology described in this disclosure could be applied to various aspects of modern finance and economics. Numerous other applications may emerge with adoption and further advances in computer processing speed and storage capacity.

In summary, the present disclosure challenges the long-held assumption of fungibility of money, at least in some form, and proposes adding a layer of granularity to money. The disclosure proposes to make money truly digital rather than analog. Once this step is overcome, it opens the door to numerous possibilities for analyzing financial flows that go far beyond what current analytical tools and approaches have to offer, all within the confines of computer processing and storage power that is available at present and will improve further in the future.

What is claimed is:

1. A method comprising:

mapping, by a processor of a payment system, unique identifiers to a plurality of accounts in an account identifier mapping table, wherein each unique identifier has a same predetermined conventional monetary value, wherein of each account in the plurality of accounts has a balance represented by a sum of the predetermined conventional monetary values of the unique identifiers mapped to that account, wherein each unique identifier is a unique bit sequence containing a first section of random bits and a second section of pre-arranged bits, and wherein a numerical value of the pre-arranged bits reflects a designated use for which the unique identifier is allowed to be used;

receiving, by the processor from a financial institution, a first request to record a first financial transfer of a given designated use and a given first amount from a first account to a second account among the plurality of accounts;

automatically calculating, by the processor and in response to receiving the first request, an amount of the first financial transfer as a collection of the unique identifiers currently mapped to the first account, wherein each unique identifier in the collection of the unique identifiers has the numerical value of the pre-arranged bits corresponding to the given designated use of the first financial transfer, and wherein the amount of the first financial transfer is represented by a sum of the predetermined conventional monetary values of the collection of the unique identifiers;

recording, by the processor in a memory coupled to the processor, the first financial transfer in a first entry of the account identifier mapping table, wherein the first entry includes an account identifier of the second account a first unique identifier in the collection of the unique identifiers, and a first timestamp when the collection of the unique identifiers was mapped to the second account;

receiving, by the processor from the financial institution, a second request to record a second financial transfer of the given designated use and a given second amount from the second account to a third account in the plurality of accounts;

automatically calculating, by the processor and in response to receiving the second request an amount of the second financial transfer as a subset of unique identifiers in the collection of the unique identifiers that are currently mapped to the second account and that include the first unique identifier, and that have the numerical value of the pre-arranged bits corresponding to the given designated use of the second financial transfer, wherein the amount of the second financial transfer is represented by a sum of the predetermined conventional monetary values of the subset of unique identifiers;

recording, by the processor, the second financial transfer in a second entry of the account identifier mapping table, wherein the second entry includes an account identifier of the third account, the first unique identifier in the subset of unique identifiers, and a second timestamp of when the subset of unique identifiers was mapped to the third account;

receiving, by the processor from an external source, an inquiry containing a plurality of suspected illicit user accounts, wherein the inquiry requests to determine whether the first unique identifier has a transaction history that traces back to at least one of the suspected illicit user accounts;

accessing, by the processor and in response to the inquiry, the account identifier mapping table to identify transactions involving the first unique identifier and producing an output table with the identified transactions including the first entry having the account identifier of the second account and the first timestamp, the second entry having the account identifier of the third account and the second timestamp, and a third entry having an account identifier of the first account and a third timestamp of when the first unique identifier was mapped to the first account;

comparing, by the processor, the first second, and third account identifiers in the output table with account identifiers of the plurality of suspected illicit user accounts; and determining, by the processor and based on the comparing, that the first unique identifier has been involved in an illicit transaction when one of the first second, and third account identifiers matches an account identifier of the at least one of the suspected illicit user accounts.

2. The method of claim 1, further comprising:

rejecting, by the processor, the first request if the sum of the predetermined conventional monetary values of the collection of the unique identifiers is below the given first amount of the first financial transfer, and recording, by the processor, the first financial transfer if the sum of the predetermined conventional monetary values of the collection of unique identifiers is at or above the given first amount of the first financial transfer.

3. The method of claim 2, further comprising:

rejecting, by the processor, the second request if the sum of conventional values of the selected unique identifiers is below the given second amount of the second financial transfer, and recording, by the processor, the second financial transfer if the sum of the predetermined conventional monetary values of the subset of unique identifiers is at or above the given second amount.

4. The method of claim 3, wherein the unique bit sequence is 128 bits in length.

5. The method of claim 1, further comprising:

setting, by the financial institution, the designated use.

6. The method of claim 1, wherein the financial institution sets the designated use prior to the mapping the unique identifiers to the plurality of accounts.

7. The method of claim 1, wherein the numerical value of the pre-arranged bits of each unique identifier reflects at least one additional designated use for which the unique identifier is allowed to be used.

8. The method of claim 1, wherein the first and second entries are rows in the account identifier mapping table.

* * * * *